(12) United States Patent
Bose et al.

(10) Patent No.: US 11,170,046 B2
(45) Date of Patent: Nov. 9, 2021

(54) NETWORK NODE CONSOLIDATION

(71) Applicant: American Express Travel Related Services Company, Inc., New York, NY (US)

(72) Inventors: Sandeep Bose, Scottsdale, AZ (US); Mario Fragoso, Peoria, AZ (US); Madhu Sudhan Reddy Gudur, Phoenix, AZ (US); Karan Anil Kumar, Tempe, AZ (US); Nivedita Singh, Scottsdale, AZ (US); Vinod Yadav, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 302 days.

(21) Appl. No.: 15/991,210

(22) Filed: May 29, 2018

(65) Prior Publication Data

US 2019/0370406 A1 Dec. 5, 2019

(51) Int. Cl.
| | |
|---|---|
| *G06F 16/901* | (2019.01) |
| *G06F 3/06* | (2006.01) |
| *G06F 16/182* | (2019.01) |
| *H04L 29/08* | (2006.01) |

(52) U.S. Cl.
CPC ........ *G06F 16/9024* (2019.01); *G06F 3/0629* (2013.01); *G06F 16/182* (2019.01); *H04L 67/1002* (2013.01)

(58) Field of Classification Search
None
See application file for complete search history.

(56) References Cited

U.S. PATENT DOCUMENTS

| | | | |
|---|---|---|---|
| 8,145,679 | B1 | 3/2012 | Baluja et al. |
| 8,386,377 | B1 | 2/2013 | Xiong |
| 9,721,039 | B2 | 8/2017 | Bier |
| 9,773,247 | B1 | 9/2017 | Keld |
| 2009/0248434 | A1 | 10/2009 | Pfeffer et al. |
| 2009/0276771 | A1* | 11/2009 | Nickolov .............. G06F 9/4856 717/177 |
| 2011/0142217 | A1 | 6/2011 | Goldfarb |
| 2011/0252032 | A1 | 10/2011 | Fitzgerald et al. |
| 2011/0270853 | A1 | 11/2011 | Curbera |
| 2012/0072475 | A1 | 3/2012 | Morrison |
| 2012/0130724 | A1 | 5/2012 | Flegel et al. |
| 2012/0324027 | A1 | 12/2012 | Vaynblat et al. |
| 2013/0124357 | A1 | 5/2013 | He et al. |

(Continued)

OTHER PUBLICATIONS

Matthew K. Meyer, U.S. Appl. No. 15/941,892, filed Mar. 30, 2018 and titled Node Linkage in Entity Graphs.

(Continued)

*Primary Examiner* — Tony Mahmoudi
*Assistant Examiner* — Umar Mian
(74) *Attorney, Agent, or Firm* — Thomas | Horstemeyer LLP

(57) ABSTRACT

A distributed file system may store a plurality of entity attributes. A node consolidating system may identify similarities between entity attributes for different entities. The node consolidating system may generate an entity graph which displays relationships and similarities between entities in a graphical user interface.

20 Claims, 3 Drawing Sheets

(56) References Cited

U.S. PATENT DOCUMENTS

| | | | |
|---|---|---|---|
| 2014/0032557 A1* | 1/2014 | Bayliss | G06F 16/285 |
| | | | 707/737 |
| 2014/0122595 A1 | 5/2014 | Murdoch et al. | |
| 2015/0339835 A1* | 11/2015 | Mohr | G06T 11/206 |
| | | | 345/440 |
| 2018/0165352 A1* | 6/2018 | Huang | G06F 16/2379 |
| 2019/0019088 A1* | 1/2019 | Wang | G06F 16/9024 |
| 2019/0114354 A1* | 4/2019 | Orun | G06F 16/24578 |

OTHER PUBLICATIONS

Matthew K. Meyer, U.S. Appl. No. 15/972,407, filed May 7, 2018 and titled Network Effect Classification.
Non-Final Office Action dated Feb. 27, 2014 in U.S. Appl. No. 13/675,651.
Final Office Action dated Jun. 13, 2014 in U.S. Appl. No. 13/675,651.
Advisory Action dated Jul. 31, 2014 in U.S. Appl. No. 13/675,651.
Non-Final Office Action dated Sep. 2, 2014 in U.S. Appl. No. 13/675,651.
Final Office Action dated Jan. 29, 2015 n U.S. Appl. No. 13/675,651.
Advisory Action dated Mar. 4, 2015 in U.S. Appl. No. 13/675,651.
Non-Final Office Action dated Aug. 25, 2016 in U.S. Appl. No. 14/750,017.
Non-Final Office Action dated May 11, 2018 in U.S. Appl. No. 15/494,792.
Final Office Action dated Oct. 12, 2018 in U.S. Appl. No. 15/494,792.
Advisory Action dated Jan. 2, 2019 in U.S. Appl. No. 15/494,792.
Non-Final Office Action dated Feb. 20, 2019 in U.S. Appl. No. 15/494,792.
Final Office Action dated Aug. 16, 2019 in U.S. Appl. No. 15/494,792.

* cited by examiner

NETWORK NODE CONSOLIDATION

FIELD

This disclosure generally relates to networks, and more particularly, to node consolidation in a network.

BACKGROUND

A network may comprise thousands or millions of nodes. Each node may represent an entity in the network. Viewed in isolation, each node may appear to represent a unique entity. However, in many cases, one person may be responsible for a node representing an individual, and the same person may be responsible for a node representing a corporation. Additionally, one person may be responsible for a node representing that person in a first country, and the same person may be responsible for a node representing that person in a different country. Furthermore, many relationships may exist between nodes, which may be difficult or impossible to understand when looking at nodes individually. Maintaining the network without understanding the relationships between nodes may require larger amounts of processing power and limit the effectiveness of the network.

SUMMARY

Systems, methods, and articles of manufacture (collectively, the "system") for providing node consolidation in a network are disclosed. The system may perform operations including storing first entity attributes for a first entity in a distributed file system; storing second entity attributes for a second entity in the distributed file system; standardizing the first entity attributes and the second entity attributes; generating, based on a matching entity attribute between the first entity attributes and the second entity attributes, a network cluster comprising a first node representing the first entity and a second node representing the second entity; loading personally identifiable information for the first entity and the second entity; calculating, and based on the personally identifiable information, a node pair confidence score that the first node and the second node represent a same entity; and assigning a global identification to the first entity and the second entity.

In various embodiments, the operations may include refining the network cluster, wherein the refining comprises removing at least one node from the network cluster. The system may generate the network cluster in response to an update to the first entity attributes. The system may calculate a network cluster confidence score. The system may associate the global identification with a first entity identification for the first entity and a second entity identification for the second entity. The system may calculate an attribute similarity score for each of the first entity attributes. The system may calculate a node pair similarity score based on the attribute similarity scores.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
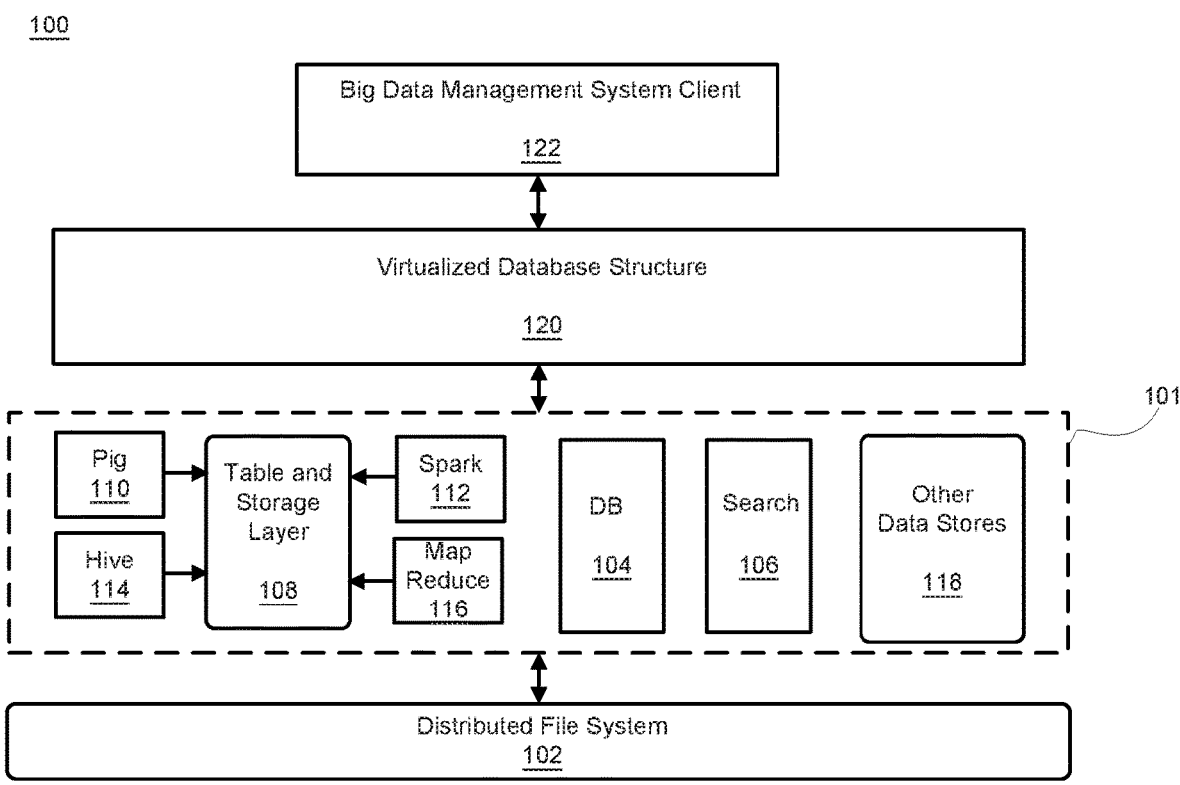
FIG. 1 illustrates a big data management system for node consolidation, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems and methods for consolidating nodes in a computer network are disclosed herein. Each node in the computer network may represent an entity, such as an individual or a business. The system may maintain an entity identification (entity ID) for each entity. The nodes may be consolidated by identifying similarities in attributes between nodes. The attributes may include data values such as name, address, phone, email, cookies, IP address, social security number, driver license, GUID, ICLIC_ID, DUNS, tax identification number, etc. A global identification (global ID) may be created to identify the nodes which are consolidated together. Thus, one global ID may be linked to multiple entity IDs.

In various embodiments, the system may provide an improved level of accuracy for partial or complete attribute matching. The system may improve accuracy of partial or complete matching for user names, business names, addresses, and/or the like. In financial or legal contexts, the improved accuracy for name matching and/or address matching may also enable the system to reduce risk and/or loss associated with fraud, security breaches, regulatory rules and/or regulatory guidelines. Benefits of the present disclosure may apply to any suitable and/or desired name matching and/or address matching use (virtual or otherwise).

This process improves the functioning of computer systems. For example, by consolidating multiple nodes in a network, the system performs fewer processing functions and provides less input, because the system is able to better understand the role of a node within a network, and perform more accurate calculations with respect to the node. With the use of this method, the system may be able to quickly and efficiently accomplish its intended task and reduce the computational time, overhead, and resource usage (e.g. memory, cpu, battery) on the system servers.

The methodology in the described processes efficiently handles processing of customer personal information in batch processes. Since fuzzy similarity matching is more useful with few certain attributes of customer personal information, a weak network graph may be developed in the initial step based on hard/direct matching on the attributes. Then, the network graph is strengthened by invoking fuzzy matching on the customers with direct linkage in the network. This approach not only simplifies the process, but saves significant amount of processing time and storage space that would have incurred if fuzzy similarity matching were used in the initial step itself. For example, fuzzy matching on customer name of 100 million customers would involve $10^{16}$ invocations of fuzzy similarity algorithm on each personal attribute information. Instead, if hard matching is performed on 100 million customers to develop a network graph based on common matching attributes, and if fuzzy matching is subsequently invoked, the process may roughly invoke just $10^{10}$ for each attribute.

As used herein, "big data" may refer to partially or fully structured, semi-structured, or unstructured data sets including hundreds of thousands of columns and records. A big data set may be compiled, for example, from a history of purchase transactions over time, from web registrations, from social media, from records of charge (ROC), from summaries of charges (SOC), from internal data, and/or from other suitable sources. Big data sets may be compiled with or without descriptive metadata such as column types, counts, percentiles, and/or other interpretive-aid data points. The big data sets may be stored in various big-data storage formats containing millions of records (i.e., rows) and numerous variables (i.e., columns) for each record.

Referring to FIG. 1, an architecture of a big data management system (BDMS) 100 for consolidating network nodes is illustrated in accordance with various embodiments. A distributed file system (DFS) 102 may serve as the physical storage medium for the various data storage formats 101 of DFS 102. A non-relational database 104 may be maintained on DFS 102. For example, the non-relational database 104 may comprise an HBase™ storage format that provides random, real time read and/or write access to data, as described and made available by the Apache Software Foundation at http://hbase.apache.org/.

In various embodiments, a search platform 106 may be maintained on DFS 102. The search platform 106 may provide distributed indexing and load balancing to support fast and reliable search results. For example, search platform 106 may comprise a Solr® search platform as described and made available by the Apache Software Foundation at http://lucene.apache.org/solr/.

In various embodiments, a data warehouse 114 such as Hive® may be maintained on DFS 102. The data warehouse 114 may support data summarization, query, and analysis of warehoused data. For example, data warehouse 114 may be a Hive® data warehouse built on Hadoop® infrastructure. A data analysis framework 110 may also be built on DFS 102 to provide data analysis tools on the distributed system. Data analysis framework 110 may include an analysis runtime environment and an interface syntax such similar to those offered in the Pig platform as described and made available by the Apache Software Foundation at https://pig.apache.org/.

In various embodiments, a cluster computing engine 112 for high-speed, large-scale data processing may also be built on DFS 102. For example, cluster computing engine 112 may comprise an Apache Spark™ computing framework running on DFS 102. The Apache Spark™ computing framework may take in customer offer interactions on different channels and transaction data in various industries as input, and the Apache Spark™ computing framework may use approximate nearest neighbors algorithms, such as locality-sensitive hashing (LSH), with Euclidean distance measures to accurately compute similarities between entities.

DFS 102 may further support a MapReduce layer 116 for processing big data sets in a parallel, distributed manner to produce records for data storage formats 101. For example, MapReduce layer 116 may be a Hadoop® MapReduce framework distributed with the Hadoop® HDFS as specified by the Apache Software Foundation at http://hadoop.apache.org/docs/. The cluster computing engine 112 and MapReduce layer 116 may ingest data for processing, transformation, and storage in data storage formats 101 using the distributed processing and storage capabilities of DFS 102.

In various embodiments, the MapReduce layer 116 may take in entity attributes as inputs. The MapReduce layer 116 may generate confidence based linkages, also referred to as edges.

In various embodiments, DFS 102 may also support a table and storage management layer 108. Table and storage management layer 108 may provide an interface for reading and writing data for multiple related storage formats. The table and storage management layer 108 may provide an interface for one or more of the interrelated technologies described above such as, for example, Hive®, Pig, Spark®, and Hadoop® MapReduce.

In various embodiments, DFS 102 may also include various other data storage formats 118. Other data storage formats 118 may have various interface languages with varying syntax to read and/or write data. In fact, each of the above disclosed storage formats may vary in query syntax and interface techniques. Virtualized database structure 120 may provide a uniform, integrated user experience by offering users a single interface point for the various different data storage formats 101 maintained on DFS 102. Virtualized database structure 120 may be a software and/or hardware layer that makes the underlying data storage formats 101 transparent to client 122 by providing variables on request. Client 122 may request and access data by requesting variables from virtualized database structure 120. Virtualized database structure 120 may then access the variables using the various interfaces of the various data storage formats 101 and return the variables to client 122.

In various embodiments, the data stored using various of the above disclosed data storage formats 101 may be stored across data storage formats 101 and accessed at a single point through virtualized database structure 120. The variables accessible through virtualized database structure 120 may be similar to a column in a table of a traditional relational DBMS. That is, the variables identify data fields available in the various data storage formats 101.

In various embodiments, variables may be stored in a single one of the data storage formats 101 or replicated across numerous data storage formats 101 to support different access characteristics. Virtualized database structure 120 may comprise a catalog of the various variables available in the various data storage formats 101. The cataloged variables enable BDMS 100 to identify and locate variables stored across different data storage formats 101 on DFS 102. Variables may be stored in at least one storage format on DFS 102 and may be replicated to multiple storage formats on DFS 102. The catalog of virtualized database structure 120 may thus track the location of a variable available in multiple storage formats.

In various embodiments, virtualized database structure 120 may provide a single, unified, and virtualized data storage format that catalogues accessible variables and provides a single access point for records stored on data storage formats 101. Client 122 may access data stored in various data storage formats 101 via the virtualized database structure 120. In that regard, virtualized database structure 120 may be a single access point for data stored across the various data storage formats 101 on DFS 102.

In various embodiments, virtualized database structure 120 may store and maintain the catalog of variables including locations and descriptive metadata, but virtualized database structure 120 may not store the actual data contained in each variable. The data that fills the variables may be stored on DFS 102 using data storage formats 101. Virtualized database structure 120 may enable read and write access to the data stored in data storage formats 101 without a client system having knowledge of the underlying data storage formats 101.

The BDMS 100 may store entity attributes for entities which have a relationship with an operator of the BDMS 100. Each entity may have an entity identification ("entity ID") which uniquely describes the entity. In various embodiments, the operator of the BDMS 100 may be a transaction account issuer. The BDMS 100 may store entity profiles of entities such as customer and merchants which have accounts or relationships with the transaction account issuer. The entity attributes may comprise identification attributes. The identification attributes may comprise data which identify or describe an entity. For example, identification attributes may include name, business name, address, phone number, email address, internet cookies, IP address, social security number, driver license number, GUID, ICLIC_ID, DUNS, tax identification number, vehicle identification number, vehicle license plate number, employer name, employer address, birth date, place of birth, etc.

In various embodiments, a single entity (e.g., an individual person) may have multiple entity accounts with the BDMS 100. For example, the individual person may have a transaction account in India, and a different transaction account in the United States. Each account may be represented by a different node and a different entity ID. The entity ID may be an alphanumeric string which uniquely identifies the account.

The BDMS 100 may identify multiple nodes within the BDMS 100 which have similar attributes. For example, the BDMS may identify all entities which have the same value for an email address. The BDMS may group the nodes with matching attributes into a network cluster for further evaluation, to determine whether the nodes represent the same entity. For the various nodes that represent the same entity, the BDMS may create a global ID and associate the global ID with all of the entity IDs for the nodes that represent the same entity.

Figure 2:
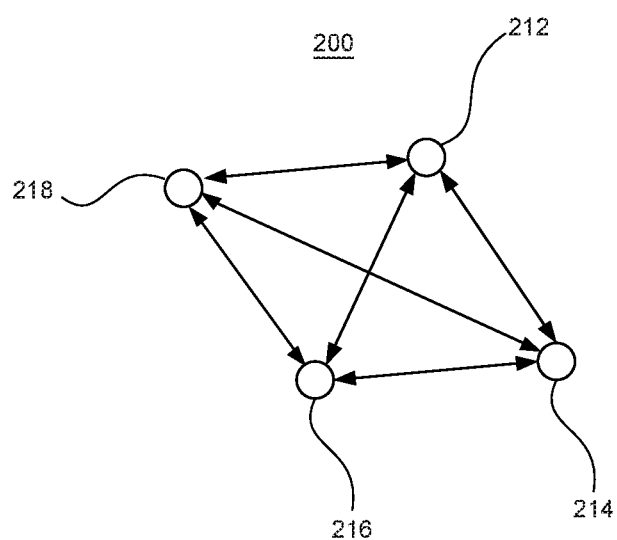
FIG. 2 illustrates a network cluster, in accordance with various embodiments.

Referring to FIG. 2, a network cluster 200 is illustrated according to various embodiments. The network cluster 200 may comprise a first node 212, a second node 214, a third node 216, and a fourth node 218. The network cluster 200 may represent the relationship between a plurality of individual nodes which each represent an entity. Each node may be associated with a different entity ID. The BDMS 100 may generate the network cluster 200 by identifying multiple nodes which share a common value for an entity attribute. For example, in various embodiments, each node in the network cluster may share an identical value for an address attribute. The first node 212 may represent a first entity. The first entity may be a customer, a merchant, a supplier, or any other entity which has a relationship with the BDMS 100. The system may include stored attributes of the first entity, including personally identifiable information.

The second node 214 may represent a second entity. The second entity may also have a relationship with the BDMS 100. The third node 216 may represent a third entity, and the fourth node 218 may represent a fourth entity.

The stored attributes for the first entity, the second entity, the third entity, and the fourth entity may indicate that all four entities have the same address. The matched address may be indicated by the edges between nodes. For example, a first edge between the first node 212 and the second node 214 may indicate that the first entity and the second entity have the same address. Similarly, a second edge between the second node 214 and the third node 216 may indicate that the second entity and the third entity have the same address, and a third edge between the first node 212 and the third node 216 may indicate that the first entity and the third entity have the same address.

In various embodiments, the network cluster may illustrate relationships between businesses. Each node may represent a business. The businesses may share a common attribute value, which may cause the BDMS 100 to link the various nodes together in the network cluster 200.

Figure 3:
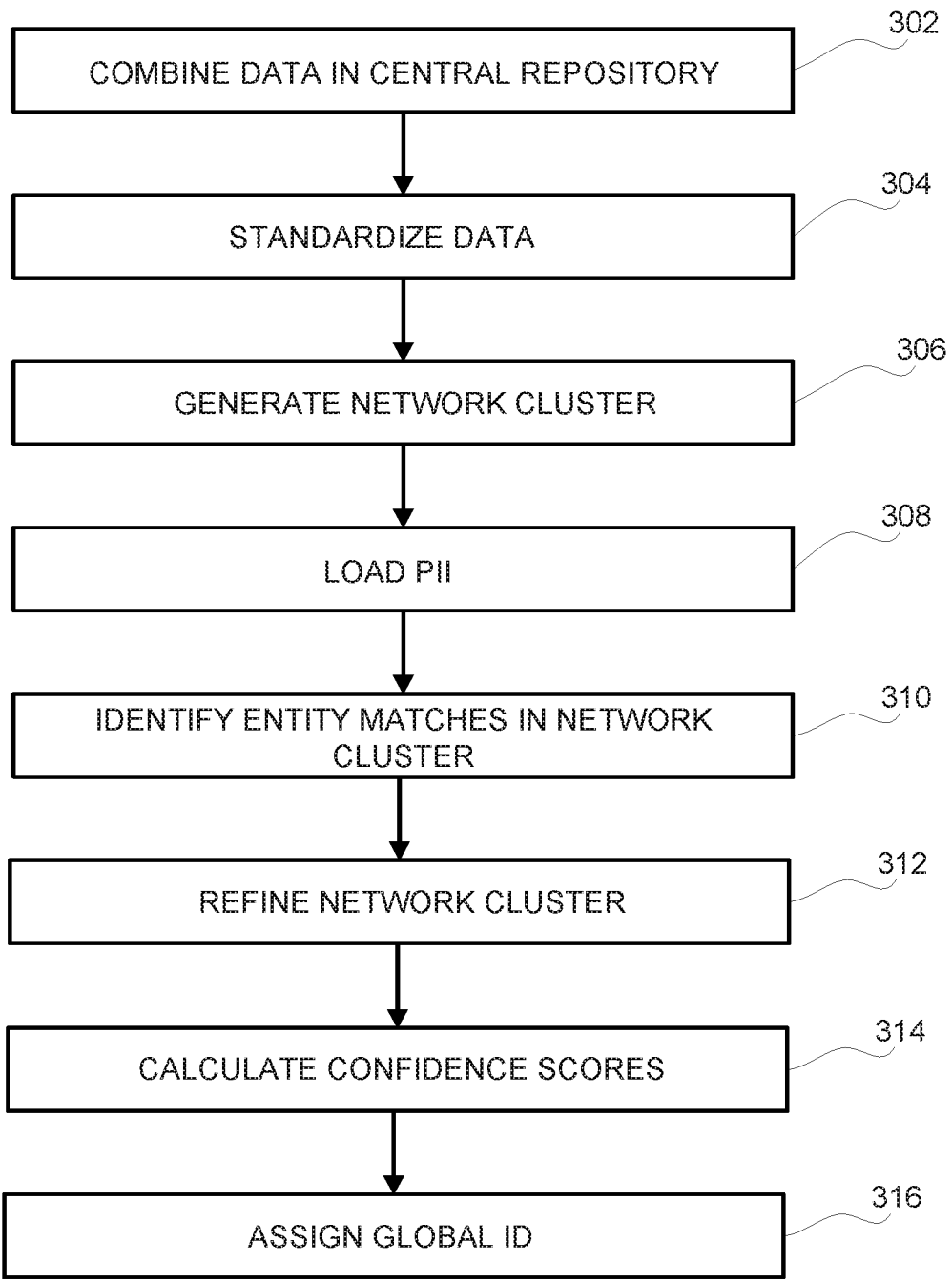
FIG. 3 illustrates a flowchart of a process for consolidating network nodes, in accordance with various embodiments.

Referring to FIG. 3, a flowchart 300 of a process for creating a global user identification is illustrated, according to various embodiments. The system may combine data from multiple systems of records (SORs) into a centralized data repository (step 302). The centralized data repository may store various data attributes that contain the rich set of customer information at all granularities in various categories, including for example, demographic, firmographic, relationship, credit risk, fraud risk, and digital attributes. Various data may be gathered directly from customers or through third party data providers.

A data quality module may standardize the ingested data (step 304). Because the central data repository ingests data from multiple systems of records, the data may be represented in different formats. For example, different systems of records may represent a city as Berkeley, California; Berkeley, CA; or Berkeley, Calif. The data quality module may comprise a built-in dictionary which the data quality module refers to in order to look for abbreviations of states, as well as algorithms to search for any mistakes in input data values. The data quality module may standardize each of the address fields to the same format. Similarly, the data quality module may standardize, filter, and cleanse data for each field in the central data repository.

A filter operation may be performed in the data quality module to screen any generic values that the customers may have in their personal information. For example, a group of customers who visit a specific coffee shop, a public library, etc. and use the wireless internet may share same IP address. A cleanser in the data quality module would help screen any of the junk information that is present in any fields of the customer personal information. For example, if the customer has provided a phone number 000-000-0000 or 123-456-7890, which follows a pattern, the phone number will be cleansed and deleted or marked as incorrect.

The system may generate a network cluster (step 306). The system may generate a cluster of a subset or all entities in the centralized data repository which share an identical attribute. For example, each entity with the exact same phone number may be grouped into a network cluster. By generating the network cluster based on exact matches or fuzzy matches in a single data field, the system may quickly identify potential matches between entities with low computational demands on the system.

In various embodiments, the system may generate a network cluster each time a data field is added or changed in the centralized data repository. For example, in response to an entity changing a phone number in the centralized data repository, the system may generate a network cluster for the new phone number.

For each entity in the network cluster, the system may load the personally identifiable information data for the entity (step 308). The schema of the data may be ID1, <PII1>, ID2, <PII2>, etc., where the personally identifiable information may be stored as JSON format, providing flexibility to the capability to expand the number and type of attributes that correspond to personally identifiable information as desired. The personally identifiable information may include attributes such as, for example, name, address, phone, email, date of birth, cookies, IP address, social security number, driver license, GUID, ICLIC_ID, DUNS, tax identification number, etc. In various embodiments, the personally identifiably information may be loaded from the centralized data repository and stored prior to standardization by the data quality module, which may ensure that none of the information is lost due to the filtering and cleansing by the data quality module.

The system may analyze the network cluster to determine whether the entities in the network cluster are the same entity (step 310). In various embodiments, the data may be analyzed in Spark batch mode as distributed in-memory computing. Each entity in the network cluster may be compared with every other entity in the network cluster to determine whether each pair represents the same entity based on common personally identifiable information between the two entities. The system may use linear regression to calculate the weights and importance of each attribute. For each pair of entities, an attribute score may be calculated for each attribute. In various embodiments, the attribute score may vary from 0 to 1, with 1 being an exact match, and 0 being no match.

In various embodiments, the attribute matches may be exact matches, in which the attribute value for one entity has an identical value as the attribute value for a different entity. In various embodiments, the matches may be inexact matches, in which the attribute value for one entity has a similar, but non-identical value, as the attribute value for a different entity. For example, a first entity may have a first name attribute value of "JOHNSON," and a second entity may have a first name attribute value of "JOHNSTON." As another example, a first entity may have an address street number attribute value of "5522," and a second entity may have an address street number attribute value of "522." In various embodiments, the system may calculate a percentage likelihood that two slightly different attribute values represent the same actual value. Fuzzy matching algorithms may determine the level of similarity between the first name attribute values of "JOHNSON" and "JOHNSTON" as 92%, a higher similarity aka representation of same first name. Similarly, the system may determine that the address street number attribute value of "5522" and "522" represent the same or different value based on application of the rule. In various embodiments, if the percentage likelihood is above 90%, the system may consider the two values to be a match. The system may cross-verify matches based on customer data, as well as acquired data, such as postal service data, in order to enrich or cleanse the data.

In various embodiments, the system may assign a score to each attribute. The system may add the individual attribute scores to obtain an overall similarity score for a pair of entities. In various embodiments, the individual attribute scores may be weighted differently according to their respective importance. The system may use linear regression to calculate a threshold score of whether two nodes should be considered as the same entity. In response to the overall similarity score being greater than the threshold score, the system may determine that the two nodes represent the same entity. In response to the overall similarity score being less than the threshold score, the system may determine that the two nodes represent different entities.

The system may refine the clusters to eliminate over linked matches (step 312). Because there are multiple personally identifiable attributes, and there is the possibility of one or more missing attributes, there is a potential to link multiple nodes which are not truly the same entity. The system may evaluate specific attributes to eliminate matches. For example, despite having a high overall similarity score, two entities may have a different date of birth. The system may determine that, because the two entities have a different date of birth, the two entities are not the same entity, regardless of the similarity score. Similarly, the system may remove matches between two entities based on having a different social security number, or other identified attributes which indicate that two entities are distinct entities, regardless of the similarity score.

The system may calculate confidence scores for the pairs of entities, as well as for the entire cluster (step 314). The confidence score may indicate a percentage likelihood that two entities represent the same individual or company. For example, a higher similarity score between two entities may result in a higher confidence score. The confidence score for the cluster may represent the likelihood that all nodes in a cluster represent the same entity. The confidence score for the cluster may be a function of each of the confidence scores for the node pairs.

The system may assign a global ID to the nodes which represent the same entity (step 316). Thus, regardless of how many entity IDs the system stores for an entity, a single global ID may encompass all of the relationships an entity maintains with the system. Therefore, when an entity interacts with the system for any reason, the system may identify the entity as being represented by all entity IDs which are associated with the global ID, which may allow the system to better provide services to the entity.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The disclosure and claims do not describe only a particular outcome of generating an entity graph, but the disclosure and claims include specific rules for implementing the outcome of generating an entity graph and that render information into a specific format that is then used and applied to create the desired results of generating an entity graph, as set forth in *McRO, Inc. v. Bandai Namco Games America Inc.* (Fed. Cir. case number 15-1080, Sep. 13, 1016). In other words, the outcome of generating an entity graph can be performed by many different types of rules and combinations of rules, and this disclosure includes various embodiments with specific rules. While the absence of complete preemption may not guarantee that a claim is eligible, the disclosure does not sufficiently preempt the field of generating an entity graph at all. The disclosure acts to narrow, confine, and otherwise tie down the disclosure so as not to cover the general abstract idea of just generating an entity graph. Significantly, other systems and methods exist for generating an entity graph, so it would be inappropriate to assert that the claimed invention preempts the field or monopolizes the basic tools of generating an entity graph. In other words, the disclosure will not prevent others from generating an entity graph, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 1015-1763 (Fed. Cir. 1016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 1015; U.S. Ser. No. 14/944,979 titled SYSTEM AND METHOD FOR READING AND WRITING TO BIG DATA STORAGE FORMATS and filed on Nov. 18, 1015; U.S. Ser. No. 14/945,032 titled SYSTEM AND METHOD FOR CREATING, TRACKING, AND MAINTAINING BIG DATA USE CASES and filed on Nov. 18, 1015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 1015; U.S. Ser. No. 14/944,898 titled SYSTEMS AND METHODS FOR TRACKING SENSITIVE DATA IN A BIG DATA ENVIRONMENT and filed on Nov. 18, 1015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 1015, the contents of each of which are herein incorporated by reference in their entirety.

Entity graphs may be constructed in a variety of formats, and those specifically described herein are merely some examples. For more information on entity graphs, see U.S. Pat. No. 9,087,088 titled SYSTEMS AND METHODS FOR DYNAMIC CONSTRUCTION OF ENTITY GRAPHS, the contents of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, Facebook, Twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A client, or web client, includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

In various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk.

All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
    storing, by a computer-based system, first entity attributes for a first entity in a distributed file system;
    storing, by the computer-based system, second entity attributes for a second entity in the distributed file system;
    standardizing, by the computer-based system, the first entity attributes and the second entity attributes;
    cleansing, by the computer-based system, the first entity attributes and the second entity attributes by removing a public shared internet protocol (IP) address from the first entity attributes and the second entity attributes;
    generating, by the computer-based system and based on an exact matching entity attribute between the first entity attributes and the second entity attributes, a network cluster comprising a first node representing the first entity and a second node representing the second entity;
    loading, by the computer-based system, personally identifiable information for the first entity and the second entity;
    calculating, by the computer-based system and based on the personally identifiable information, a node pair confidence score that indicates that the network cluster generated based on the exact matching entity attribute between the first node and the second node represent a same entity based upon a fuzzy matching of a remainder of individual attributes from the first entity and the second entity, wherein the individual attributes are weighted according to a respective importance and the fuzzy matching is based on a linear regression to calculate the node pair confidence score, wherein the node pair confidence score meets a threshold similarity score that indicates that the first entity and the second entity represent the same entity; and
    assigning, by the computer-based system, a global identification to the first entity and the second entity.

2. The method of claim 1, further comprising refining, by the computer-based system, the network cluster, wherein the refining comprises removing at least one node from the network cluster.

3. The method of claim 1, further comprising generating, by the computer-based system, the network cluster in response to an update to the first entity attributes.

4. The method of claim 1, further comprising calculating, by the computer-based system, a network cluster confidence score.

5. The method of claim 1, further comprising associating, by the computer-based system, the global identification with a first entity identification for the first entity and a second entity identification for the second entity.

6. The method of claim 1, further comprising calculating, by the computer-based system, an attribute similarity score for each of the first entity attributes.

7. The method of claim 6, further comprising calculating, by the computer-based system, a node pair similarity score based on the attribute similarity scores.

8. A system comprising:
    a processor,
    a tangible, non-transitory memory configured to communicate with the processor, and
    the tangible, non-transitory memory having instructions stored thereon that, in response to execution by the processor, cause the processor to perform operations comprising:
        storing, by the processor, first entity attributes for a first entity in a distributed file system;
        storing, by the processor, second entity attributes for a second entity in the distributed file system;
        standardizing, by the processor, the first entity attributes and the second entity attributes;
        cleansing, by the processor, the first entity attributes and the second entity attributes by removing a public shared internet protocol (IP) address from the first entity attributes and the second entity attributes;
        generating, by the processor and based on an exact matching entity attribute between the first entity attributes and the second entity attributes, a network cluster comprising a first node representing the first entity and a second node representing the second entity;
        loading, by the processor, personally identifiable information for the first entity and the second entity;
        calculating, by the processor and based on the personally identifiable information, a node pair confidence score that indicates that the network cluster generated based on the exact matching entity attribute between the first node and the second node represent a same entity based upon a fuzzy matching of a remainder of individual attributes from the first entity and the second entity, wherein the individual attributes are weighted according to a respective importance and the fuzzy matching is based on a linear regression to calculate the node pair confidence score, wherein the node pair confidence score meets a threshold similarity score that indicates that the first entity and the second entity represent the same entity; and assigning, by the processor, a global identification to the first entity and the second entity.

9. The system of claim 8, the operations further comprising refining, by the processor, the network cluster, wherein the refining comprises removing at least one node from the network cluster.

10. The system of claim 8, the operations further comprising generating, by the processor, the network cluster in response to an update to the first entity attributes.

11. The system of claim 8, the operations further comprising calculating, by the processor, a network cluster confidence score.

12. The system of claim 8, the operations further comprising associating, by the processor, the global identification with a first entity identification for the first entity and a second entity identification for the second entity.

13. The system of claim 8, the operations further comprising calculating, by the processor, an attribute similarity score for each of the first entity attributes.

14. The system of claim 13, the operations further comprising calculating, by the processor, a node pair similarity score based on the attribute similarity scores.

15. An article of manufacture including a non-transitory, tangible computer readable storage medium having instructions stored thereon that, in response to execution by a computer-based system, cause the computer-based system to perform operations comprising:

storing, by the computer-based system, first entity attributes for a first entity in a distributed file system;

storing, by the computer-based system, second entity attributes for a second entity in the distributed file system;

standardizing, by the computer-based system, the first entity attributes and the second entity attributes;

cleansing, by the computer-based system, the first entity attributes and the second entity attributes by removing a public shared internet protocol (IP) address from the first entity attributes and the second entity attributes;

generating, by the computer-based system and based on an exact matching entity attribute between the first entity attributes and the second entity attributes, a network cluster comprising a first node representing the first entity and a second node representing the second entity;

loading, by the computer-based system, personally identifiable information for the first entity and the second entity;

calculating, by the computer-based system and based on the personally identifiable information, a node pair confidence score that indicates that the network cluster generated based on the exact matching entity attribute between the first node and the second node represent a same entity based upon a fuzzy matching of a remainder of individual attributes from the first entity and the second entity, wherein the individual attributes are weighted according to a respective importance and the fuzzy matching is based on a linear regression to calculate the node pair confidence score, wherein the node pair confidence score meets a threshold similarity score that indicates that the first entity and the second entity represent the same entity; and assigning, by the computer-based system, a global identification to the first entity and the second entity.

16. The article of manufacture of claim 15, the operations further comprising refining, by the computer-based system, the network cluster, wherein the refining comprises removing at least one node from the network cluster.

17. The article of manufacture of claim 15, the operations further comprising generating, by the computer-based system, the network cluster in response to an update to the first entity attributes.

18. The article of manufacture of claim 15, the operations further comprising calculating, by the computer-based system, a network cluster confidence score.

19. The article of manufacture of claim 15, the operations further comprising associating, by the computer-based system, the global identification with a first entity identification for the first entity and a second entity identification for the second entity.

20. The article of manufacture of claim 15, the operations further comprising calculating, by the computer-based system, an attribute similarity score for each of the first entity attributes.

* * * * *